(12) United States Patent
Lomagno

(10) Patent No.: US 6,793,290 B2
(45) Date of Patent: Sep. 21, 2004

(54) HEADREST SUPPORTING ROD, PARTICULARLY FOR VEHICLE SEATS

(75) Inventor: Mauro Lomagno, Frossasco (IT)

(73) Assignee: Gestind S.p.A., Strada Statale (IT)

( * ) Notice: Subject to any disclaimer, the term of this patent is extended or adjusted under 35 U.S.C. 154(b) by 0 days.

(21) Appl. No.: 10/253,913

(22) Filed: Sep. 25, 2002

(65) Prior Publication Data

US 2003/0085606 A1 May 8, 2003

(30) Foreign Application Priority Data

Sep. 27, 2001 (IT) .................................. TO20010180 U

(51) Int. Cl.$^7$ .............................................. A47B 97/00
(52) U.S. Cl. .................................................. 297/463.1
(58) Field of Search ........................... 297/463.2, 463.1, 297/391, 410; 248/118, 161, 407, 423, 157

(56) References Cited

U.S. PATENT DOCUMENTS 3,895,771 A * 7/1975 Baum ...................... 248/188.7
5,860,703 A * 1/1999 Courtois et al.
6,068,337 A * 5/2000 De Filippo

FOREIGN PATENT DOCUMENTS

| DE | 36 36 932 C | 3/1988 |
| DE | 92 02 846 U | 5/1992 |
| DE | 297 22 513 U | 4/1998 |
| DE | 297 17 568 U | 2/1999 |

OTHER PUBLICATIONS

European Search Report, Dec. 10, 2002.

* cited by examiner

*Primary Examiner*—Milton Nelson, Jr.
(74) *Attorney, Agent, or Firm*—Shlesinger, Arkwright & Garvey LLP

(57) ABSTRACT

A headrest supporting rod for a vehicle seat has a body of molded plastic material, preferably ABS, and an outer coating layer coating the body of plastic material; the material defining the coating layer having at least one metal component.

19 Claims, 1 Drawing Sheet

HEADREST SUPPORTING ROD, PARTICULARLY FOR VEHICLE SEATS

The present invention relates to a headrest supporting rod, particularly for vehicle seats.

BACKGROUND OF THE INVENTION

As is known, seats in general, and vehicle seats in particular, feature headrests, each of which comprises a cushioned supporting body, and two supporting rods projecting from the supporting body and connected to the backrest of the seat or to the supporting body itself in axially sliding manner, so as to adjust the height of the supporting body.

The supporting rods are normally made of plastic or metal. Though lighter and easier to form than metal rods, plastic rods have the drawback of failing to meet increasing demand in terms of appearance, by the colour of the rods depending on the material used, and only being variable in shade to form rods with reflecting or mirror surfaces similar to ordinary metal rods.

SUMMARY OF THE INVENTION

It is an object of the present invention to provide a headrest supporting rod designed to provide a straightforward, low-cost solution to the above problems, and which at the same time is cheap and easy to produce, is highly reliable and functional, and maintains the same aesthetic characteristics even after prolonged use.

According to the present invention, there is provided a headrest supporting rod for a vehicle seat, the rod being characterized by comprising a body of plastic material, and an outer layer of coating material coating the body of plastic material.

In the rod defined above, said layer of coating material is conveniently less than 20 $\mu$m thick, and comprises at least one metal component.

BRIEF DESCRIPTION OF THE DRAWINGS

A non-limiting embodiment of the invention will be described by way of example with reference to the accompanying drawings, in which.

DETAILED DESCRIPTION OF THE INVENTION

Figure 1:
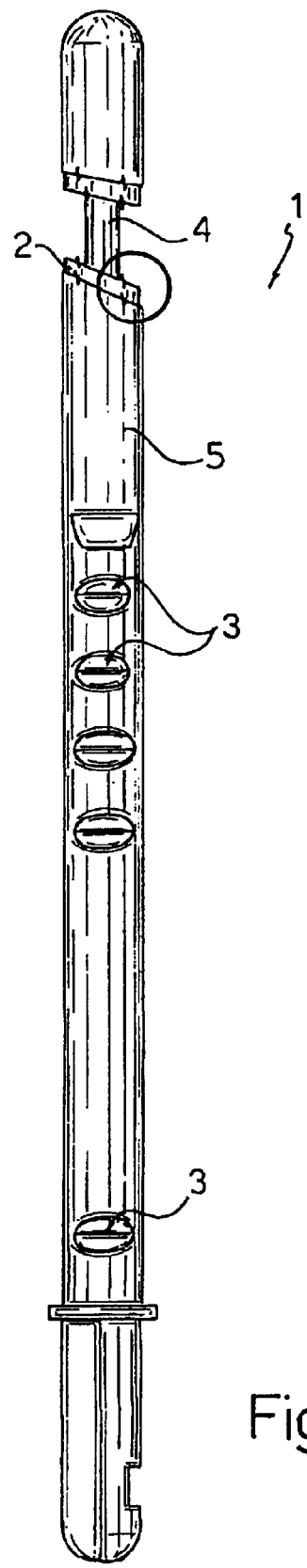
FIG. 1 shows a side view, with parts removed for clarity, of a preferred embodiment of a supporting rod in accordance with the teachings of the present invention.
Figure 2:
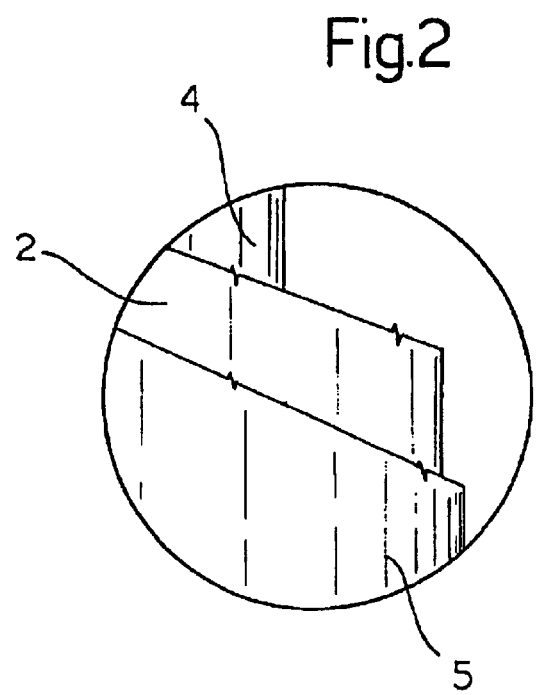
FIG. 2 shows a greatly enlarged view, with parts removed for clarity, of a portion of the FIG. 1 rod.

Number 1 in FIG. 1 indicates a rod for a known headrest (not shown) of a vehicle seat (not shown).

Rod 1, which is substantially cylindrical, comprises a body 2 made of molded plastic material and in which are formed a number of known notches or seats 3; and a conveniently metal inner core 4 embedded in body 2 of plastic material. In the example described, the plastic material is conveniently chromium platable ABS, and in particular a material known by the trade name "GREENLAC CROME NATURALE" manufactured by PLASTIGREEN S.R.L., the physical, mechanical, electrical, and thermal characteristics of which are shown in the following TABLE 1, and are the result of testing specimens to ASTM standard D 618 (40 h-23° C.—50% U.R.).

TABLE 1

| TRANSFORMATION DATA | UNIT | VALUES | | |
|---|---|---|---|---|
| Molding conditions: | | | | |
| Cylinder | ° C. | 200–240 | | |
| Mold | ° C. | 50–70 | | |
| Mean longitudinal molding shrinkage (3.2 mm) | % | 0.5–0.7 | | |
| Mean transverse molding shrinkage (3.2 mm) | % | 0.5–0.7 | | |

| | | | STANDARDS | | |
|---|---|---|---|---|---|
| PHYSICAL AND OTHERS PROPERTIES | UNITS | VALUES | ASTM | ISO | OTHERS |
| Density | Mg/m3 | 1.04 | D 792 | R 1183 | |
| Water absorption (24 h) | % | 0.15 | D 570 | | |
| Water absorption (to saturation) | % | 0.4 | D 570 | | |
| UL thickness 3.2–1.6 | | HB | | R 1133 | UL 94 |
| Melt index (220° C./10 kg) | g/10' | 9–14 | D 1238 | | |
| ASTM thickness 3.2 mm | | // | D 635 | | |
| MECHANICAL CHARACTERISTICS | | | | | |
| Impact strength-IZOD with 3.2 mm thick notch | J/m | 300 | D 256 | R 180 | |
| Tensile yield point | MN/m2 | 44 | D 638 | R 527 | |
| Ultimate elongation | % | 55 | D 638 | R 527 | |
| Flexural yield point | MN/m2 | 63 | 790 | R 178 | |
| Modulus of elasticity in bending 11 | MN/m2 | 2100 | 790 | R 178 | |
| THERMAL CHARACTERISTICS | | | | | |
| HDT (temperature in bending under load) | | | | | |
| 1.81 MN/m2 | ° C. | 83 | D 648 | R 75 | |
| 0.45 MN/m2 | ° C. | 99 | D 648 | R 75 | |
| Vicat temperature | | | | | |
| 49 N | ° C. | 104 | D 1525 | R 306 | |
| 9.8 N | ° C. | 95 | D 1525 | R 306 | |

TABLE 1-continued

| Marble test | | / | | IEC 335-1 |
|---|---|---|---|---|
| ELECTRICAL CHARACTERISTICS | | | | |
| Resistance to sliding currents - CTI | | | | |
| Solution A | | V | 500 | IEC 112 |
| Solution B | | V | 400 M | IEC 112 |

In particular, as shown in TABLE 1, the plastic material used has a density of substantially 1.04 Mg/m and generally ranging between 1 and 1.06 Mg/m; longitudinal shrinkage substantially equal to transverse shrinkage and conveniently ranging between 0.5 and 0.7%; and a 3.2 mm notch impact strength of substantially 300 J/m.

The outer surface of body 2 is coated with a layer 5 of coating material, which is less than 20 μm and normally 4 to 8 μm thick, and which, in appearance, is smooth, shiny and/or reflecting, and coloured. The coating material conveniently comprises at least one metal component, which, in the example described, is a chromium-based material which can be deposited on body 2 of plastic material by chromium plating. In the embodiment described, layer 5 covers the entire outer surface of body 2 of plastic material, including notches or seats 3. Alternatively, layer 5 may be formed using a material having another metal or nonmetal component instead of or in combination with chromium, so that, besides being shiny and reflecting, the outer surface of rod 1 may be of different colours and shades.

By making the rod from a specific chromium platable material, e.g. having the characteristics shown in TABLE 1, and by chromium plating the plastic material, rods can be obtained which, above all, have the same mechanical characteristics as conventional plastic rods, but which, unlike plastic rods, also have the advantage of having perfectly shiny, reflecting outer surfaces resistant to sliding abrasion, bending stress and shock in the same way as ordinary metal rods.

Clearly, changes may be made to rod 1 as described herein without, however, departing from the scope of the present invention. In particular, body 2 of plastic material may be made of a material having at least some characteristics differing from those in TABLE 1, but which nevertheless still provides for obtaining a stable coating which remains unchanged in normal test and operating conditions of the rods.

Clearly, the term "rod" is intended to mean any portion projecting from the seat or from the cushioned body of the headrest, and therefore also the end portions of any monolithic elements or elements having no other portions extending, for example, inside the cushioned body or inside the backrest to support the headrest.

What is claimed is:

1. A headrest supporting rod for a vehicle seat comprising a body of plastic material, and an outer layer of coating material on said body of plastic material, said outer layer of coating material is applied onto said body of plastic material by coating and wherein said plastic material has a density ranging between 1 and 1.06 Mg/m.

2. A headrest supporting rod for a vehicle seat comprising a body of plastic material, and an outer layer of coating material on said body of plastic material, said outer layer of coating material is applied onto said body of plastic material by coating and wherein said layer of coating material is less than 20 μm thick.

3. A rod as claimed in claim 2 and wherein the material defining said outer layer of coating material comprises at least one metal component.

4. A rod as claimed in claim 2 wherein said outer layer of coating material is reflecting.

5. A rod as claimed in claim 2 and wherein said body of plastic material is chromium platable, and said outer layer of coating material is made of chromium-based material.

6. A rod as claimed in claim 2 and wherein said plastic material is ABS.

7. A rod as claimed in claim 2 and wherein said plastic material has a longitudinal and transverse shrinkage range between 0.5 and 0.7%.

8. A headrest supporting rod for a vehicle seat comprising a body of plastic material, and an outer layer of coating material on said body of plastic material, said outer layer of coating material is applied onto said body of plastic material by coating and wherein said plastic material has a longitudinal shrinkage and a transverse shrinkage that are substantially equal.

9. A rod as claimed in claim 8, and wherein the material defining said outer layer of coating material comprises at least one metal component.

10. A rod as claimed in claim 8 wherein said outer layer of coating material is reflecting.

11. A rod as claimed in claim 8 and wherein said body of plastic material is chromium platable, and said outer layer of coating material is made of chromium-based material.

12. A rod as claimed in claim 8 and wherein said plastic material is ABS.

13. A rod as claimed in claim 8 and wherein said plastic material has a longitudinal and transverse shrinkage range between 0.5 and 0.7%.

14. A headrest supporting rod for a vehicle seat comprising a body of plastic material, and an outer layer of coating material on said body of plastic material, said outer layer of coating material is applied onto said body of plastic material by coating and wherein said body of plastic material is chromium platable, and said outer layer of coating material is made of chromium-based material.

15. A rod as claimed in claim 14 and wherein said plastic material has a longitudinal and transverse shrinkage range between 0.5 and 0.7%.

16. A rod as claimed in claim 14 and wherein the material defining said outer layer of coating material comprises at least one metal component.

17. A rod as claimed in claim 14 wherein said outer layer of coating material is reflecting.

18. A rod as claimed in claim 14 and wherein said plastic material is ABS.

19. A headrest supporting rod for a vehicle seat comprising a body of plastic material, and an outer layer of coating material on said body of plastic material, said outer layer of coating material is applied onto said body of plastic material by coating and wherein said plastic material has a 3.2 mm notch impact strength substantially 300 J/m.

* * * * *